(12) United States Patent  
Sng et al.

(10) Patent No.: US 8,146,730 B2
(45) Date of Patent: *Apr. 3, 2012

(54) HIGH SPEED DIVERTER

(75) Inventors: John Hee Kwee Sng, Singapore (SG); Choon Beng Chua, Singapore (SG); Rajendran Rajeshkumar, Singapore (SG); Muthiah Jayagopi, Singapore (SG)

(73) Assignee: Pteris Global Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 13/104,033

(22) Filed: May 10, 2011

(65) Prior Publication Data

US 2011/0220458 A1 Sep. 15, 2011

Related U.S. Application Data

(63) Continuation of application No. 12/537,234, filed on Aug. 6, 2009, now Pat. No. 7,963,385.

(60) Provisional application No. 61/086,475, filed on Aug. 6, 2008.

(51) Int. Cl.
*B65G 47/46* (2006.01)

(52) U.S. Cl. .................... 198/370.07; 198/367

(58) Field of Classification Search ............ 198/367, 198/370.07

See application file for complete search history.

(56) References Cited

U.S. PATENT DOCUMENTS

| 3,093,236 | A | 6/1963 | McLaughlin |
| 4,643,291 | A | 2/1987 | Counter et al. |
| 4,711,357 | A | 12/1987 | Langenbeck et al. |
| 5,217,104 | A | 6/1993 | Pelletier |
| 5,452,786 | A | 9/1995 | Gilmore |
| 5,655,643 | A | 8/1997 | Bonnet |
| 6,220,422 | B1 | 4/2001 | Lee |
| 6,607,065 | B2 | 8/2003 | Peppel |
| 6,974,020 | B1 | 12/2005 | Pepper |
| 7,124,876 | B2 | 10/2006 | Wolf |
| 7,261,198 | B2 | 8/2007 | Tatar et al. |
| 7,469,780 | B2 | 12/2008 | Bang |
| 2002/0070094 | A1 | 6/2002 | Peppel |

FOREIGN PATENT DOCUMENTS

EP 0903309 A1 3/1999
JP 2006008279 A 1/2006

*Primary Examiner* — Mark A Deuble
(74) *Attorney, Agent, or Firm* — Horizon IP Pte Ltd

(57) ABSTRACT

A diverter assembly for handling articles transported on a conveying surface is disclosed. The diverter assembly includes at least one diverter arm and a motor coupled to a drive arrangement for swinging the diverter arm over the conveying surface. An inverter controller is provided for operating the motor at a plurality of speeds. A sensor arrangement is coupled to the inverter controller for monitoring the position of the diverter arm. The sensor arrangement sends a slow-down signal to the inverter controller when the diverter arm reaches a pre-determined position, causing the inverter controller to operate the motor at a slower speed.

21 Claims, 18 Drawing Sheets

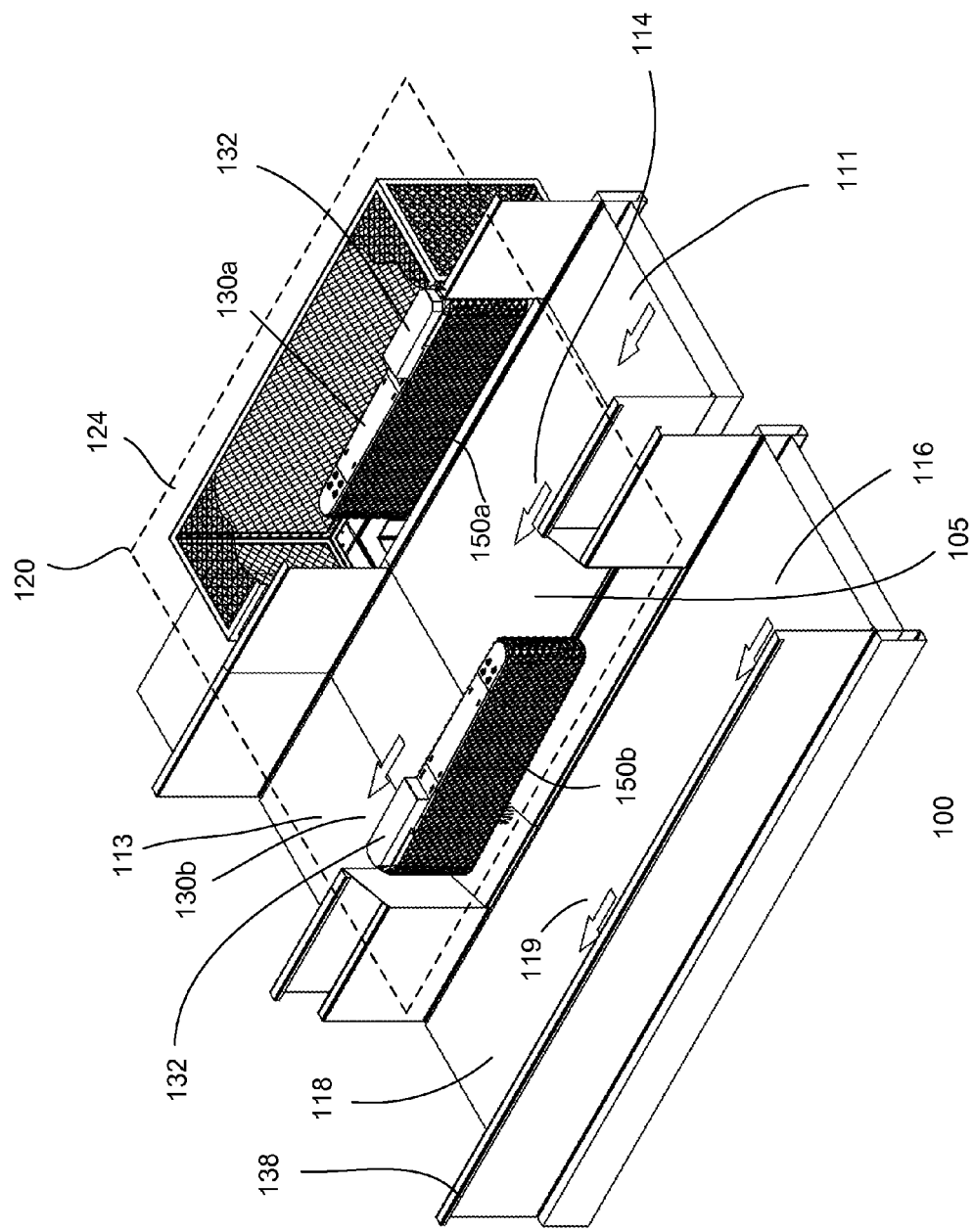

Digital Input "DI 18" : Extend Command From Main PLC
Digital Input "DI 29" : Reset Command From Main PLC Digital Input "DI 33" : Extend Slow Down Proximity Sensor
Digital Input "DI 29" : Reset Command From Main PLC SL Time-out 0 : Extend Delay Stop Timer Digital Input "DI 29" : Reset Command From Main PLC Digital Input "DI 19" : Retract Command From Main PLC
Digital Input "DI 32" : Retract Slow Down Proximity Sensor

HIGH SPEED DIVERTER

CROSS-REFERENCE TO RELATED APPLICATIONS

This application is a continuation of U.S. patent application Ser. No. 12/537,234, filed Aug. 6, 2009, entitled "HIGH SPEED DIVERTER", currently pending, which claims priority to U.S. Provisional Application No. 61/086,475, filed Aug. 6, 2008. The entire contents of these related applications are incorporated herein by reference in their entirety.

TECHNICAL FIELD

This invention generally relates to a technology for handling articles and, in particular, to diverting articles on a conveying surface.

BACKGROUND

Article handling systems, such as those used in airports to handle baggage, typically include diverters for diverting or sorting articles transported on a conveyor. Diverters may include arms that are pivotably mounted adjacent to the conveyor. The arms are driven to move across the surface of the conveyor to divert an article being transported on the conveying surface.

In order to increase the throughput of the articles, it is desirable to drive the diverters at high speed. However, the faster the diverters are operated, the greater the equipment vibrates and the impact caused on the articles. This can result in damage to the articles that are being diverted as well as being very noisy during operation.

In addition, conventional diverter systems tend to be mechanically complex with many components subject to wear and tear. For example, belt systems are typically incorporated to drive the swinging of the diverter arms. Such belt systems require tension adjustment and replacement over time. In order to adjust and replace the belts, the diverter system has to be disassembled, resulting in long down-times for maintenance.

Therefore, there is a need for a diverter that can be operated at high speeds while generating less vibrations and impact on diverted articles. In addition, there is a need for a simpler diverter drive system with fewer components, which is less costly to maintain.

SUMMARY

A diverter assembly for handling articles transported on a conveying surface is described herein. The diverter assembly includes at least one diverter arm and a motor coupled to a drive arrangement for swinging the diverter arm over the conveying surface. An inverter controller is provided for operating the motor at a plurality of speeds. A sensor arrangement is coupled to the inverter controller for monitoring the position of the diverter arm. The sensor arrangement sends a slow-down signal to the inverter controller when the diverter arm reaches a pre-determined position, causing the inverter controller to operate the motor at a slower speed.

Other objects, features and advantages of the invention will become more apparent upon study of the following detailed description taken in conjunction with the drawings.

BRIEF DESCRIPTION OF THE DRAWINGS

The same numbers are used throughout the drawings to reference like elements and features.

FIGS. 1a-b show an embodiment of a conveyor system with a diverting assembly in home and divert positions.

DETAILED DESCRIPTION

The following description sets forth various embodiments of a diverter assembly. The diverter assembly may be used in many applications, including but not limited to airport baggage handling systems for diverting bags, article sorting systems and the like.

Figure 1B:
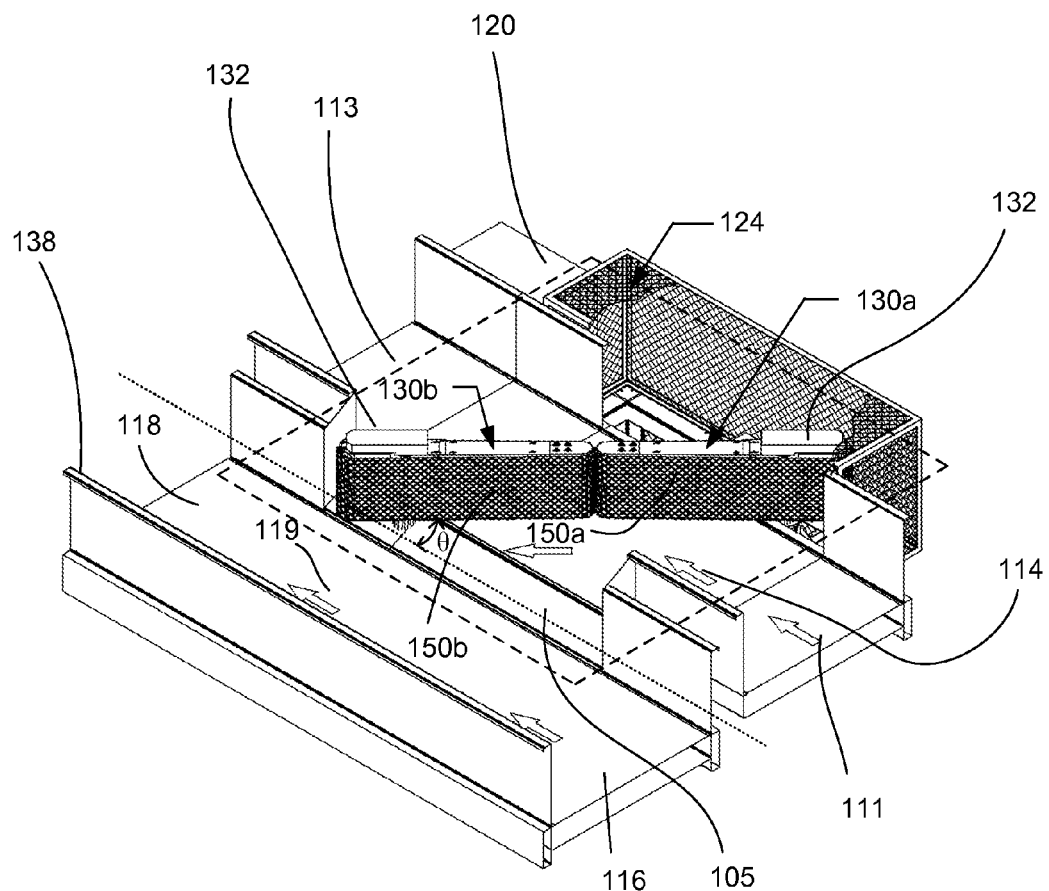

FIGS. 1a-b show a portion of a conveying system 100 in a divert area which incorporates an embodiment of a diverter assembly 120. FIG. 1a shows the diverter assembly in the home (non-divert) position while FIG. 1b shows the diverting assembly in the active (divert) position. The conveying system, for example, includes first and second conveyors 111 and 116 with first and second conveying surfaces 113 and 118. The first and second conveyors may have different origination and destination points. In one embodiment, the first and second conveying surfaces comprise belt surfaces. Other types of surfaces, such as driven rollers, other driven surfaces or non-driven surfaces, may also be used. Rails 138 can be provided on sides of the conveyors to maintain packages being conveyed within the conveyors.

Figure 2:
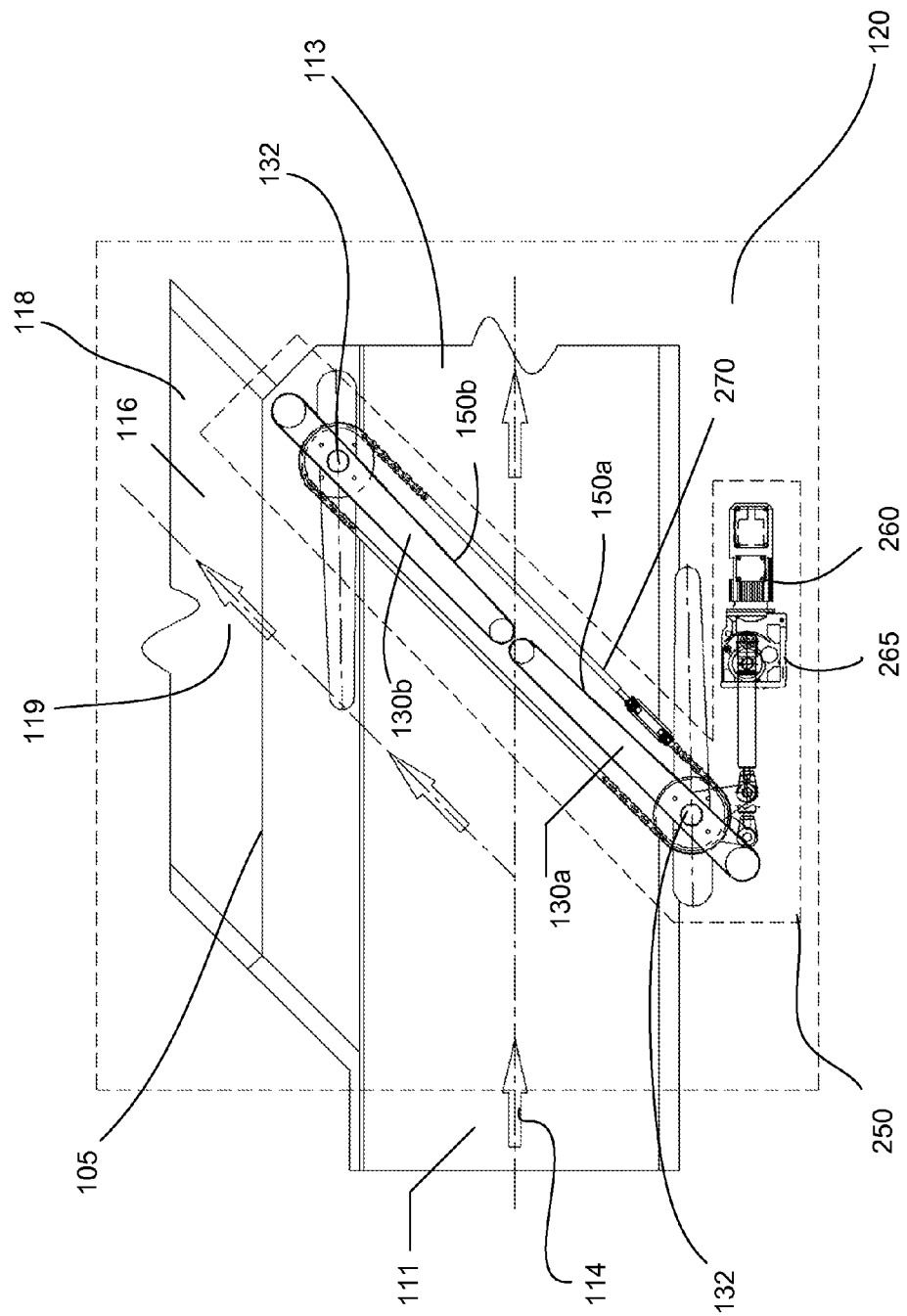
FIG. 2 is another embodiment of a conveyor system.

The conveying surface of the first or primary conveyor moves in a first direction (as indicated by arrows 114); the second conveying surface of the second or secondary conveyor moves in a second direction (as indicated by arrows 119). Preferably, the second direction continues forward along the first direction after diversion. For example, as shown, the first and second directions are parallel and in the same direction. Alternatively, the first and second directions can also be at an angle, such as about 45°, as shown in FIG. 2. Other angles or configurations of first and second directions are also useful.

The diverter assembly is disposed in the path of the primary conveyor. In one embodiment, the diverter assembly is mounted onto a diverter assembly frame (not shown) disposed below the primary conveyer. The diverter assembly includes first and second diverter arms 130a-b disposed above the primary conveyor. The diverter arms are positioned on opposite sides of the primary conveyor, mirroring each other. The diverter arms are rotatable around diverter arm shaft 132 at about a first end of the arms. The diverter arms are rotated to be in either the home or divert position.

When the diverter arms are in the home position, the diverter arms are retracted beyond the edges of first conveying surface such that their lengths are substantially parallel to the sides of the primary conveyor. Articles transported on the primary conveyor are allowed to travel past the divert area and remain on primary conveyor.

In one embodiment, when a package is to be diverted, the diverter arms are actuated. Actuating the diverter arms causes them to rotate around the axis of rotation such that they are collinear or substantially collinear over the primary conveyor, as shown in FIG. 1b. For example, the diverter arms are rotated to move the second ends towards each other. The diverter arms form an angle (divert angle) with respect to the direction of the primary conveyor. Preferably, the divert angle is about 45°. In another embodiment, the divert angle can be about 20-60°. Providing other divert angles which can transfer articles from the primary to the secondary conveyor may also be useful.

In the divert position, the second ends of diverter arms preferably should be relatively close to each other to reduce or minimize the gap between the arms to avoid articles from being trapped in the gap. The gap, for example, is about 5-10 mm. Additionally, the height of the diverter arm should be sufficient to divert the articles transported by the conveyor system. For example, the height of the diverter arm should be at least ½ the height of the tallest article being transported. Preferably, the height of the diverter arm should be greater than the height of the tallest article being transported. For example, the height should be about ¾ the height of the tallest article being transported.

A diverter arm may include a diverting surface (150a or 150b). The diverting surface, in one embodiment, comprises a rotating or driven belt which rotates around the frame of the diverter arm. The belt, for example, rotates around the frame of the diverter arm in a direction which facilitates moving a package from the primary to the secondary conveyor. The diverting surfaces of the arms are driven in a direction to form a continuous diverting surface to maintain the article moving in the forward direction. For example, in the illustrative embodiment, the belts of the diverter arms rotate in a clockwise direction. The diverting surface preferably maintains the forward speed of the package at a constant speed as it is diverted to the secondary conveyor.

The speed of the belts depends on the speed of the primary conveyor and divert angle. In one embodiment, the speed of the belts is equal to about conveyor speed/cos θ, where θ is the divert angle. For example, in the case where θ is equal to 45°, the speed of the diverting surface can be about 1.4 times the conveyor speed. Driving the belts at other speeds may also be useful. In another embodiment, the belt speed is about 10% to 100% above the conveying speed of the primary conveyor.

A diverter arm guard 124 may be provided. As shown, the diverter arm guard is provided on an exposed side of the first conveyor. For applications in which both sides of the conveyor may be exposed, guards can be provided for both sides.

FIG. 2 shows an alternative embodiment of a conveyor system 100 in a divert area with a diverter assembly 120 in greater detail. The conveyor system includes a primary conveyor 111 with a first conveying surface 113 and a secondary conveyor 116 with a second conveying surface 118. The conveying surface 113 of the first or primary conveyor moves in a first direction (as indicated by arrows 114); the second conveying surface 118 of the second or secondary conveyor moves in a second direction (as indicated by arrows 119). As shown, the secondary conveyor is merged with the primary conveyor (merged conveyors) at an angle of about 45°. Having merged conveyors at other angles may also be useful. Other types of conveyor layouts are also useful, depending on the flow requirements of the application.

The diverter assembly is disposed in the path of the primary conveyor. In one embodiment, the diverter assembly includes a frame (not shown) disposed below the primary conveyer. Mounted to the frame and above the primary conveyor are first and second diverter arms 130a-b with diverting surfaces 150a-b. The diverter arms positioned on opposite sides of the primary conveyor, mirroring each other. The diverter arms are rotatable around a diverter arm shaft 132 at about a first end of the arms. The diverter arms are rotated to be in either the home or divert position, as previously described.

A drive train 250 is provided to drive the diverter arms. The drive train, in one embodiment, comprises a drive or drive motor 260, a drive unit 265 and link unit 270. The link unit mechanically couples the diverter arms together. The drive unit couples the link unit to the motor. When the motor rotates, the drive train causes the diverter arms to swing into the divert position or retract back into the home position.

In one embodiment, the diverter assembly is capable of producing fast diverter arm swing time. Swing time refers to the time it takes for a diverter arm to more from one position to the other. For example, diverter swing times of about 0.3-0.5 seconds or less can be achieved to enable handling high article sorting rates, for example, greater than 60-80 articles per minute. Furthermore, this fast swing time is achieved smoothly and accurately without vibrations, which improves reliability of the diverter assembly.

Figure 3:
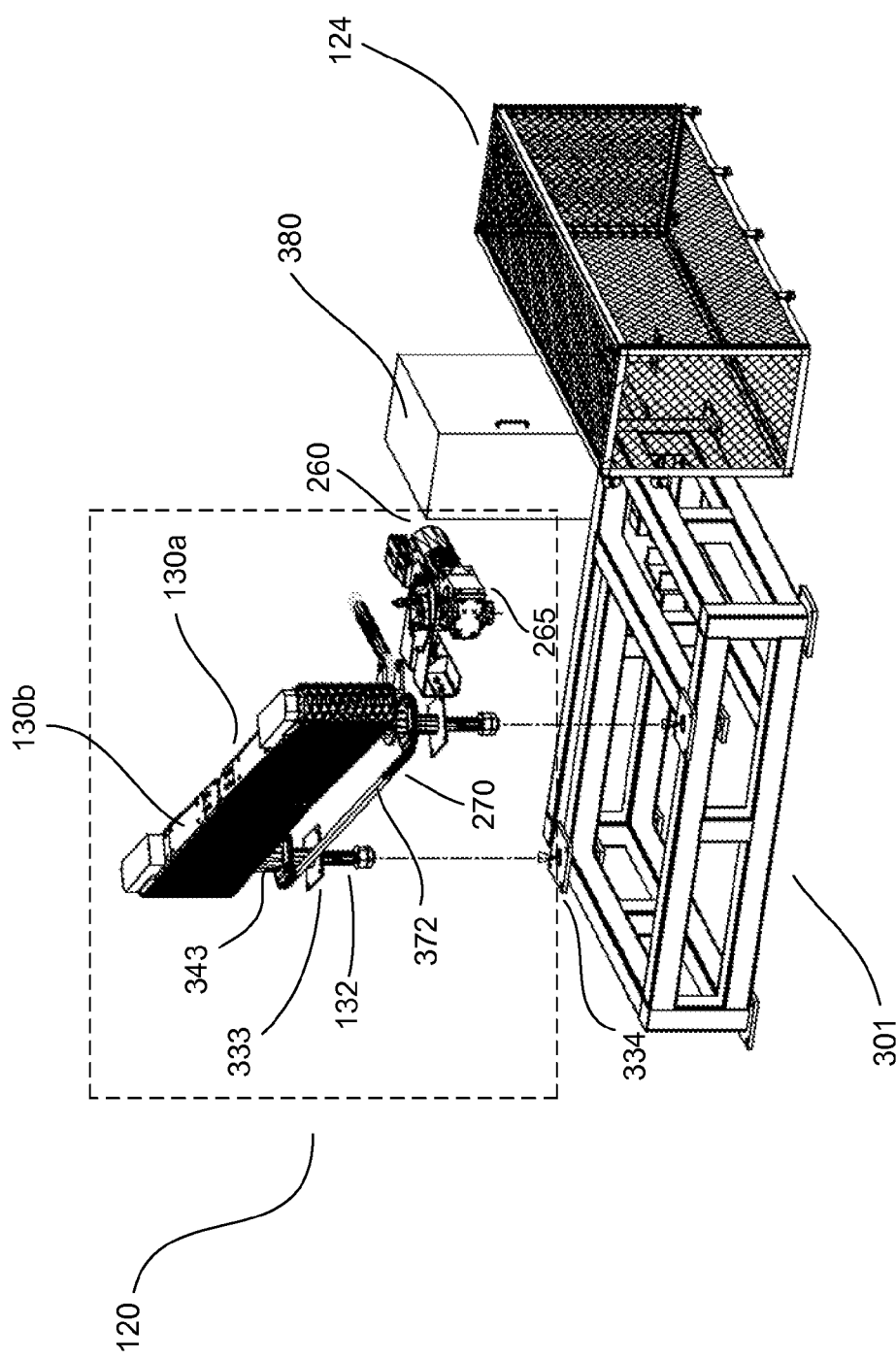
FIG. 3 is an exploded perspective view of an exemplary diverter assembly.

FIG. 3 shows a perspective view of one embodiment of a diverter assembly 120. Diverter assembly 120 includes first and second diverting arms 130a-b drivingly coupled by a link unit 270. In one embodiment, the link unit comprises a sprocket chain unit. For example, each diverter arm is mounted onto a diverter arm shaft 132 which includes a sprocket 343 to form a diverter arm unit. The sprockets of the diverter arms are coupled by a chain coupler 372, interconnecting the diverter arm units. Other types of link units are also useful.

The diverter arm units are mounted onto a diverter assembly frame 301. In one embodiment, diverter arm mounts 333 are provided which are mated to frame mounts 334. The shaft of a diverter arm passes through the mount, enabling it to freely rotate. The mounts can be mated using, for example, bolts. In one embodiment, at least four bolts are used for each mount in order to counter extra shock loads during operation. Other techniques for mounting the diverter arm units to the frame are also useful.

A drive unit 265 couples the link unit 270 to a drive motor 260 which is controlled by a controller unit 380. Upon receipt of command signals from the controller unit, the drive motor is actuated to cause the diverter arms 130a-b to move to either the home or divert position. For example, if the diverter arms are in the home position, drive motor causes them to move into the divert position and vice-versa. A diverter arm guard 124 may be provided. As shown, the diverter arm guard is provided on an exposed side of the first conveyor. For applications in which both sides of the conveyor may be exposed, guards can be provided for both sides.

Figure 4:
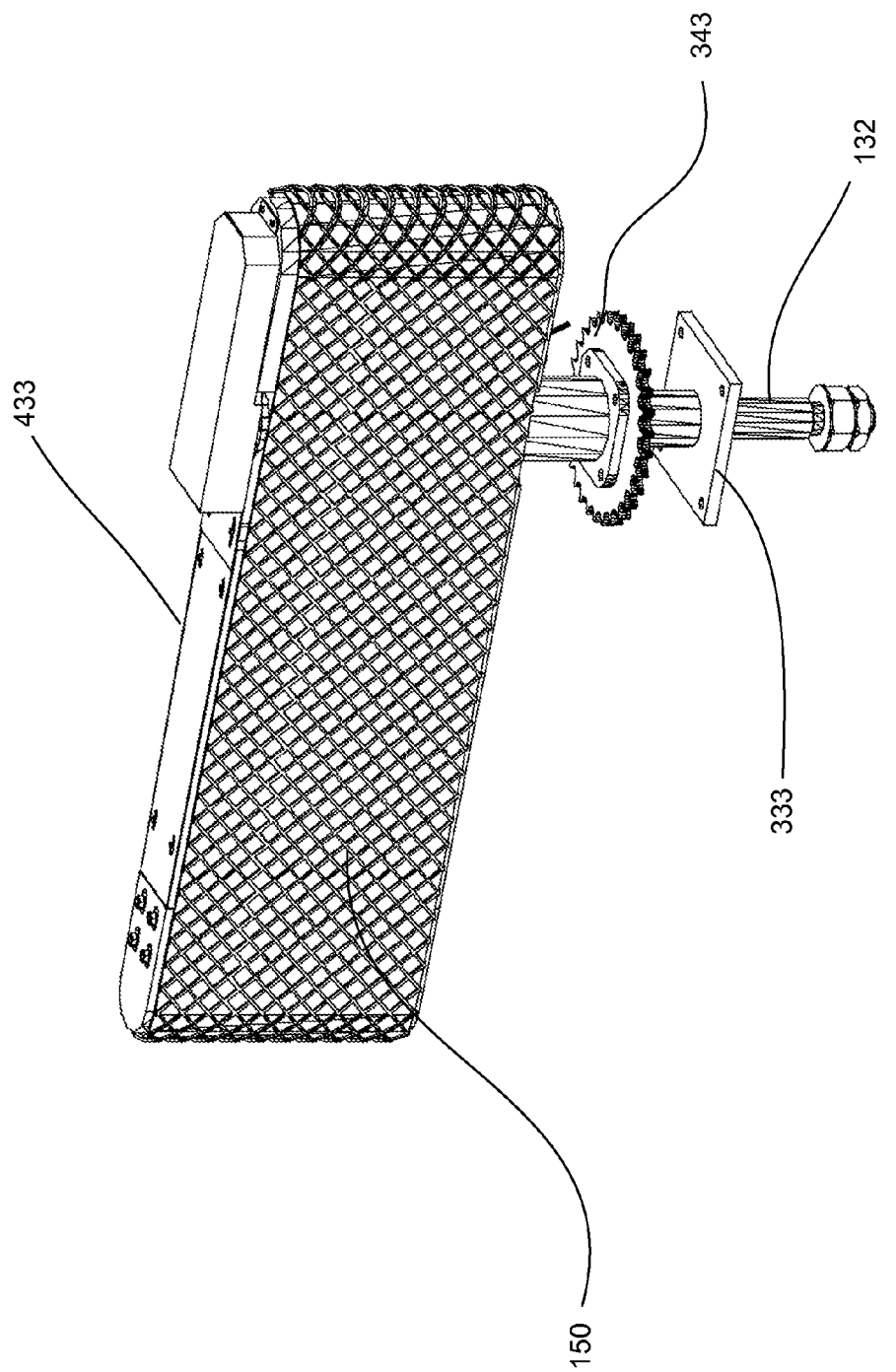
FIG. 4 is a perspective view of an exemplary diverter arm unit.

FIG. 4 is a perspective view of an exemplary diverter arm unit 430. In one embodiment, diverter arm unit includes a diverter arm 130 with a diverting surface 150 supported by a frame 433 which is mounted onto an arm shaft 132. In the illustrated example, the diverting surface is a driven belt. Other types of surfaces, such as driven rollers, other types of driven surfaces or non-driven surfaces, may also be used. In one embodiment, an arm mount 333 is provided on the arm shaft to facilitate mounting onto a frame. The diverter arm unit may further include a sprocket 343, which forms part of the chain-sprocket link unit. The chain-sprocket link unit will be more fully described below.

Figure 5:
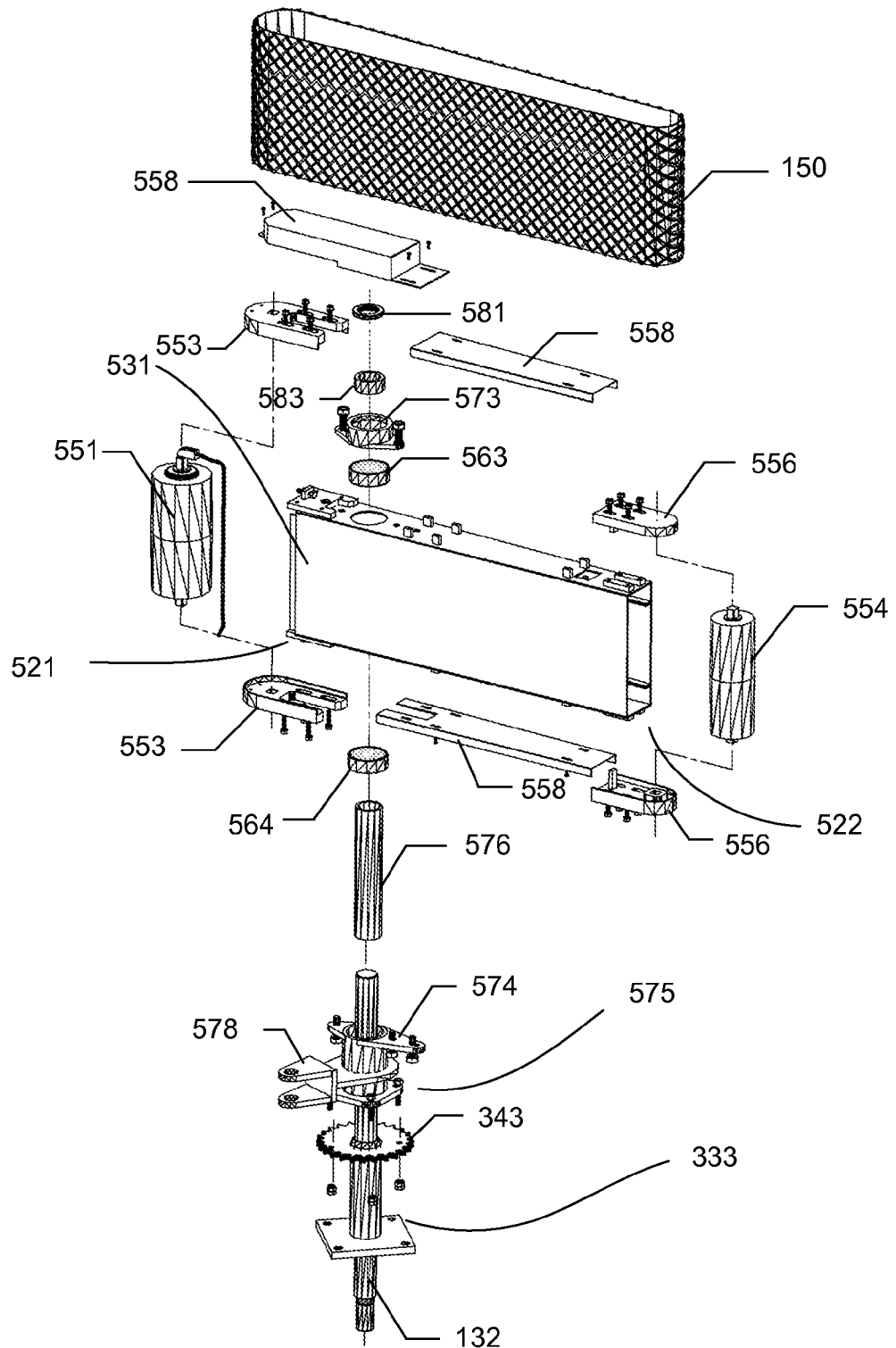
FIG. 5 is an exploded perspective view of the exemplary diverter arm unit.

FIG. 5 shows an exploded perspective view of the exemplary diverter arm unit 430. The diverter arm unit includes a diverter arm frame 531 having first and second ends 521 and 522. In one embodiment, a motorized drum pulley 551 is mounted onto a first end of the arm frame using drive roller mount plates 553. In one embodiment, a free roller 554 is mounted to the second end of the diverter arm frame using free roller mount plates 556. The plates, for example, are bolted to the frame. A belt 150, which serves as the diverting surface, is mounted onto rollers to form the diverter arm. The tension of the drive belt can be adjusted by varying the positions of the rollers via the roller mount plates. The motorized drive pulley, when activated, rotates or drives the belt.

Top and bottom angular contact bearings 563 and 564 are disposed on top and bottom surfaces of the frame at about the first end when it is to be mounted onto a diverter arm shaft 132. To firmly hold the contact bearings in place, top bearing housing 573, sleeve 576 and bottom bearing housing 574 are used. The bearing housings are mounted to the top and bottom surfaces of the frame using, for example, bolts. The bottom housing also includes a sprocket mount 575 for mounting a sprocket 343 thereto with, for example, bolts. In one embodiment, one of the diverter arms is coupled to the drive unit. A yoke connector 578 is provided in the bottom bearing housing to facilitate coupling with the drive unit.

The diverter arm is mounted to an upper portion of a diverter arm shaft 132. For example, the diverter arm shaft is inserted through bottom angular bearing, sleeve and upper angular bearing. To securely hold the top bearing onto the shaft, a lock nut 581 with a lock washer 583 can be employed. This in turn holds the diverter arm securely in place with respect to the diverter shaft, preventing it from lifting during operation. The angular bearings allow the diverter arm to freely rotate around the diverter shaft. A lower portion of the shaft includes a diverter arm mount 333 for mounting the diverter arm unit to a diverter frame. Cover plates 558 may be provided to cover the exposed portions of the top and bottom of the diverter arm to prevent potential damage to articles.

Figure 6:
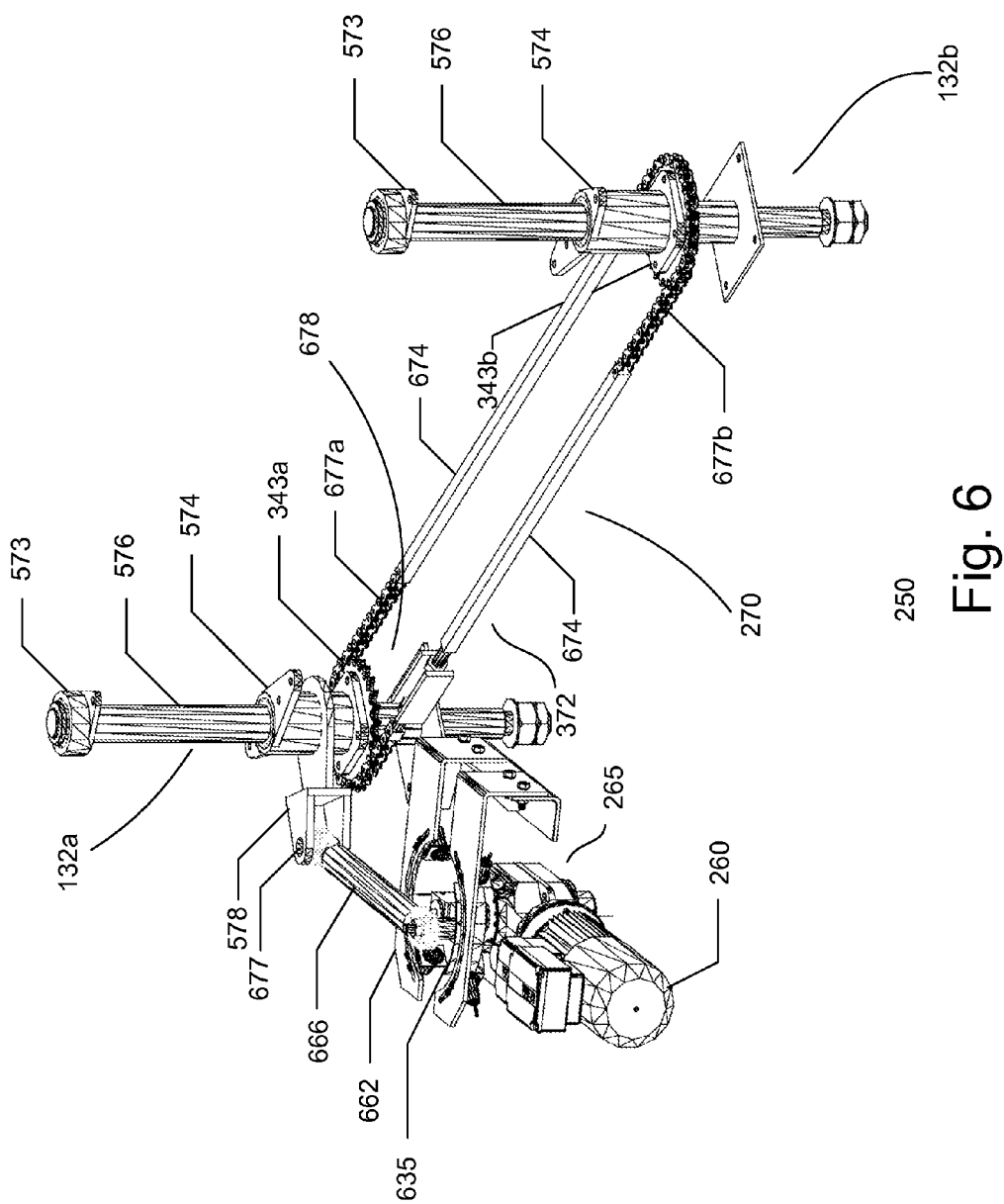
FIG. 6 is a perspective view of an exemplary drive chain for a diverting assembly.
Figure 7:
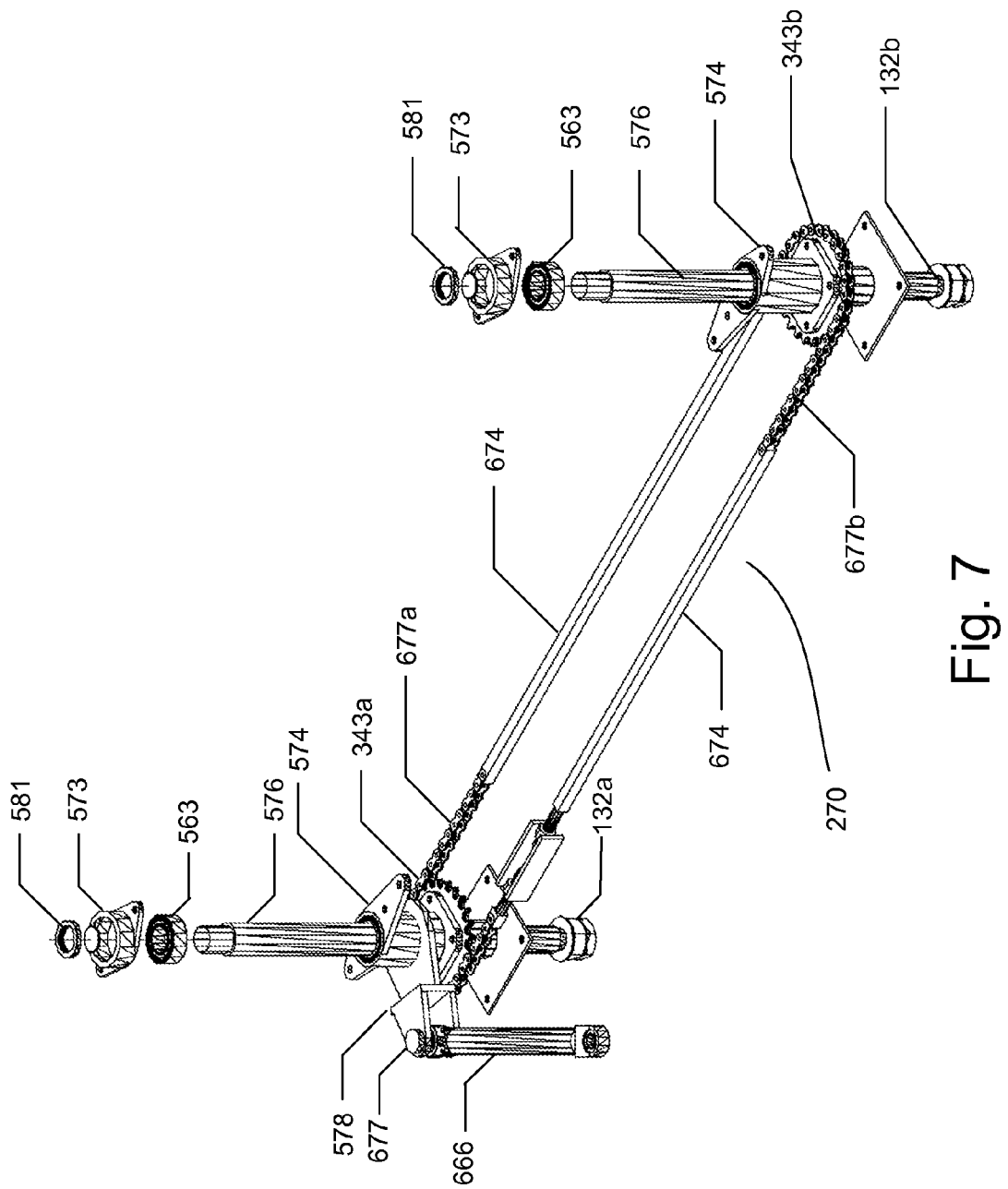
FIG. 7 is an exploded perspective view of the exemplary link unit.

FIG. 6 shows a perspective view of an embodiment of a drive train 250. The drive train includes a drive motor 260, a drive unit 265 and a chain sprocket link unit 270. FIG. 7 shows an exploded perspective view of an embodiment of a chain-sprocket link unit 270.

Referring to FIGS. 6-7, the link unit is illustrated using diverter arm shafts 132a-b. As shown, a diverter arm shaft is assembled with top and bottom bearing housings 573 and 574 (including bearings) and a sleeve 576. A sprocket (343a or 343b) is attached to the bottom bearing housing. For the diverter arm shaft 132a, which is attached to the drive unit, the bottom bearing housing includes a yoke connector 578.

The chain link unit includes a coupler 372 which includes chain portions 677a-b connected by connecting rod portions 674. The first and second chain portions are mated to the first and second sprockets 343a-b, respectively, of the diverter arms. An adjustor 678 may be provided to adjust the tension or slack in the coupler.

The drive unit includes a drive rod 666 and a swivel arm 635. A first end of the drive rod is coupled to the yoke connector 578 of the first diverter arm shaft 132a while a second end of the drive rod is coupled to the swivel arm. Coupling of the drive rod to the swivel arm and yoke connector can be achieved using, for example, rod end bearings and bolts. The swivel arm is in turn coupled to the motor.

When the motor is switched on, it causes the swivel arm to rotate so as to actuate the drive unit, causing the first sprocket of the first diverter shaft 132a to rotate. As first sprocket rotates, it engages the first chain portion which is interconnected to the second chain, thereby rotating the second sprocket of the second diverter arm. In this manner, the diverter arm units may be driven to move generally simultaneously to swing between the home and divert positions.

In one embodiment, a sensor plate 662 is provided. The sensor plate is disposed in the drive unit. Sensors are mounted onto the sensor plate to determine the position of the diverter arms. For example, the sensors detect the position of the swivel arm to determine the position of the diverter arms.

In one embodiment, a sensor plate 662 is provided. The sensor plate is disposed in the drive unit. Sensors are mounted onto the sensor plate to determine the position of the diverter arms. For example, the sensors detect the position of the swivel arm to determine the position of the diverter arms.

Figure 8:
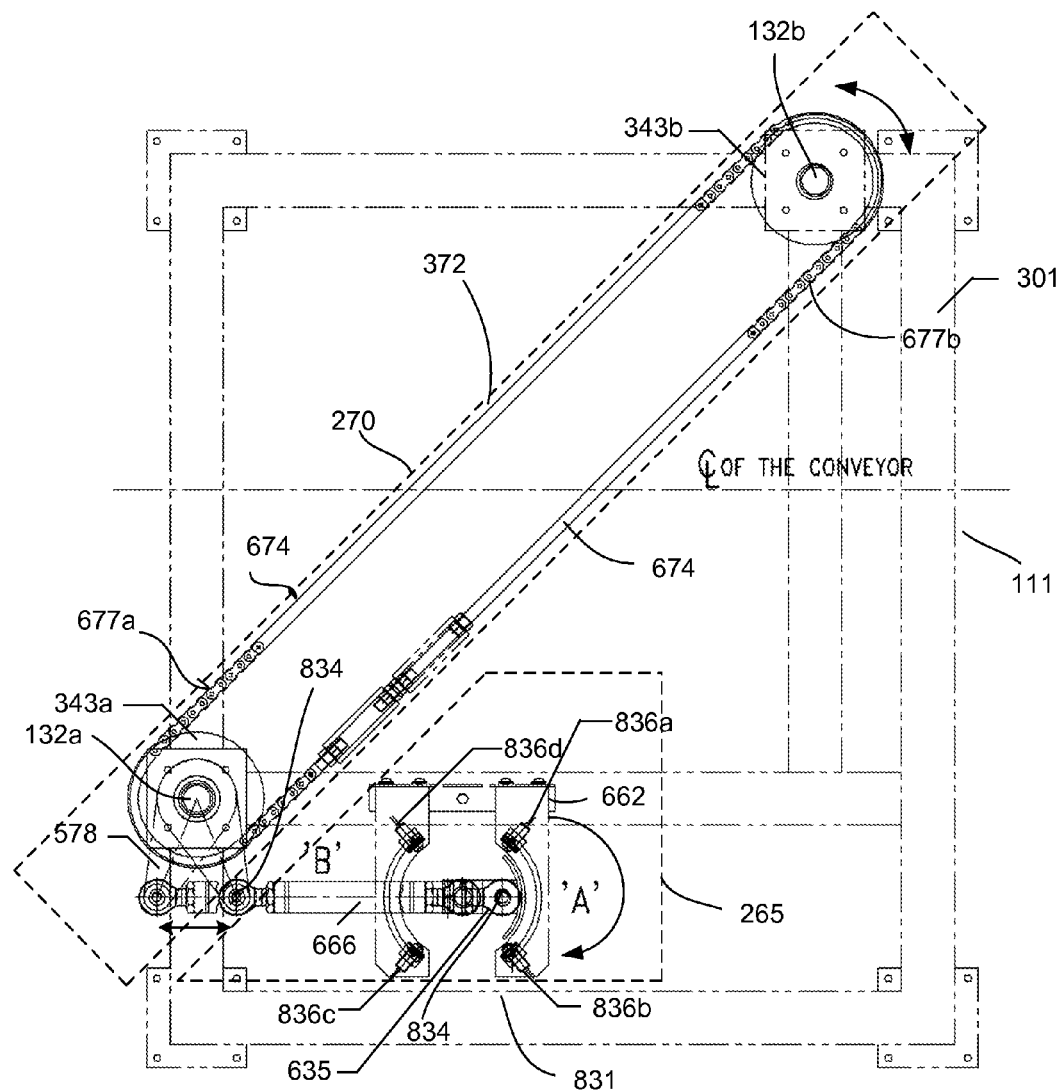
FIG. 8 is a plan view of exemplary link and drive units.

FIG. 8 shows a plan view of a portion of an embodiment of a diverter assembly 120 disposed the path of a primary conveyor 111. In particular, the portion shows link unit 270 and drive unit 265 in operation to actuate diverter arms (not shown) on first and second diverter arm shafts 132a-b mounted on a frame 301. First and second sprockets 343a-b are provided on first and second diverter arm shafts, respectively. A coupler 372 having first and second chain portions 677a-b, which are connected by connecting rod portions 674, are mated to the first and second sprockets 343a-b to form a chain-sprocket link unit.

The drive unit is coupled to the link unit. In one embodiment, the drive unit comprises a drive rod 666 and swivel arm 635. A first end of the drive rod is coupled to the yoke connector on the first diverter arm shaft while a second end of the drive rod is coupled to the swivel arm. Coupling of the drive rod to the swivel arm and yoke connector can be achieved using, for example, rod end bearings 834 and bolts. The swivel arm is in turn coupled to a motor. The motor, for example, can be foot mounted to the base of the frame.

When the motor is switched on, it causes the swivel arm to rotate so as to actuate the drive unit. In one embodiment, the swivel arm is rotated by the motor in a first direction. The first direction, for example, can be in a clockwise direction. Rotating the swivel arm in a counter-clockwise direction may also be useful.

When swivel arm is driven by drive motor to position 'A', the drive linkage causes the chain-sprocket link to swing diverter arms (not shown) to a first position. The first position, for example, is the divert position. When swivel arm is driven by the motor to position 'B', chain-sprocket link operates to swing first and second diverter arms to a second position, for example, the home position. Further, when the swing drive motor operates in the same rotational direction as the previous swing, swivel arm moves from position 'B' back to position 'A', thereby bringing the diverter arms back to the first or divert position.

In one embodiment, a sensor arrangement 831 is provided on a sensor mounting plate 662. The sensor arrangement is used to monitor the position of the swivel arm as it rotates. For purposes of illustration, sensor arrangement comprises four position sensors 836a-d. Other suitable numbers of position sensors and arrangements may also be used. In one embodiment, first and third position sensors 836a and 836c positioned opposite each other are coupled to, in one embodiment, an inverter controller (not shown) for slowing down the swing speed of the diverter arms (e.g., Extend Slow Down and Retract Slow Down Proximity Sensors). Second and fourth position sensors 836b and 836d, in one embodiment, are coupled to a programmable logic controller or PLC (not shown) for determining and confirming the diverter arm positions (Extend and Retract Proximity Sensors). These components will be described in more detail below.

Figure 9:
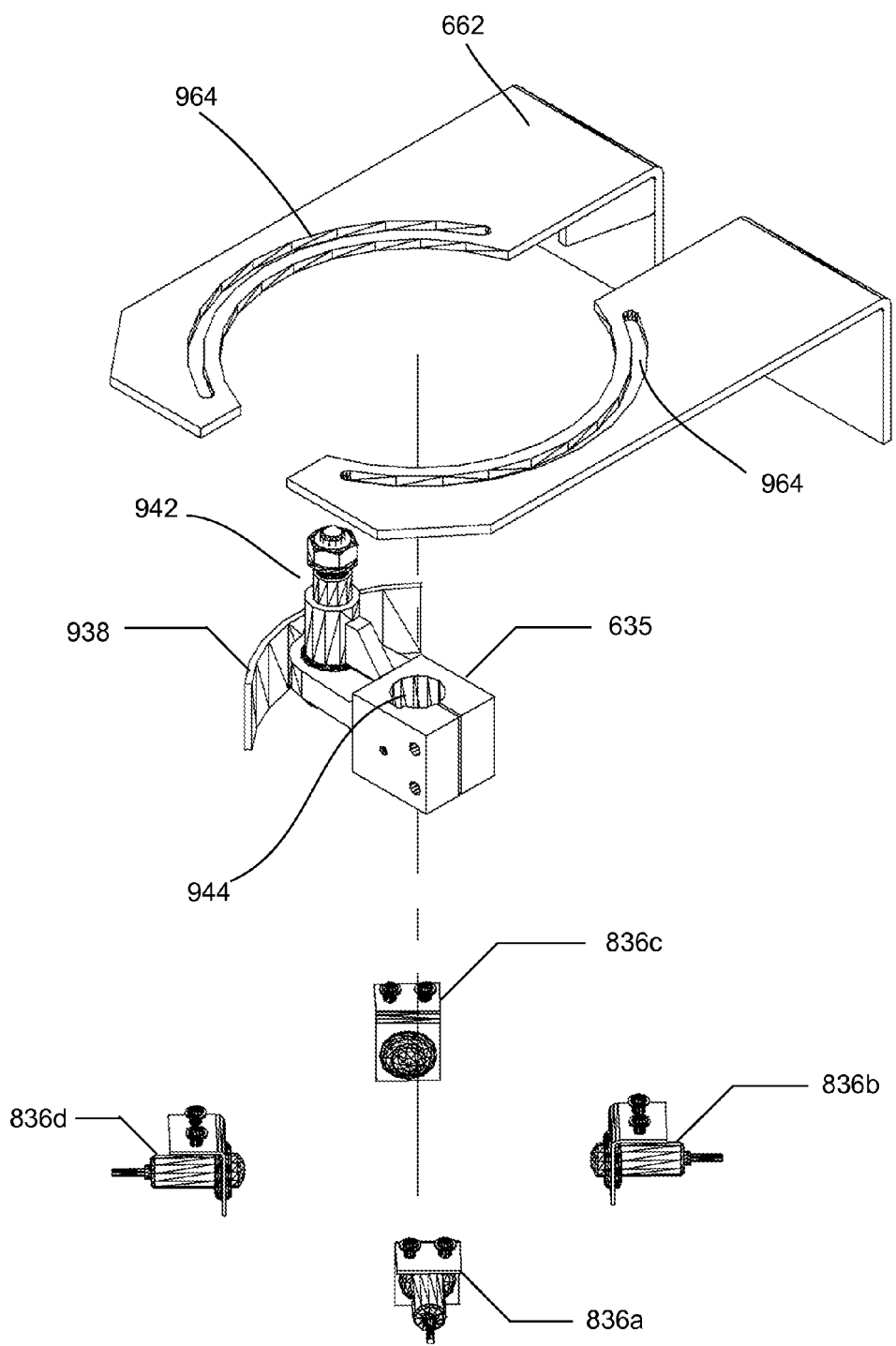
FIG. 9 is an exploded perspective view of an exemplary sensor arrangement.

FIG. 9 is an exploded perspective view of an exemplary sensor arrangement 831. The sensor arrangement, in one embodiment, includes a sensor mounting plate 662. The sensor mounting plate includes curved slots 964 on which sensors are mounted. In one embodiment, four sensors 836a-d are mounted onto the sensor plate. The sensors, for example, comprise proximity sensors.

The sensor plate is mounted onto the frame such that the swivel arm which coupled to the motor through opening 944 rotates within the slots. The swivel arm includes a curved sensor activation plate 938. The sensor activation plates activates the sensors as it rotates pass them. For example, when the diverter arms are in the home position, the swivel arm will be in position 'B' (as shown in FIG. 8) with the fourth sensor 836d being activated by the sensor plate. Similarly, when the diverter arms are in the divert position, the swivel arm will be in position 'A' (as shown in FIG. 8), causing the sensor plate to activate the second position sensor 836b.

Figure 10:
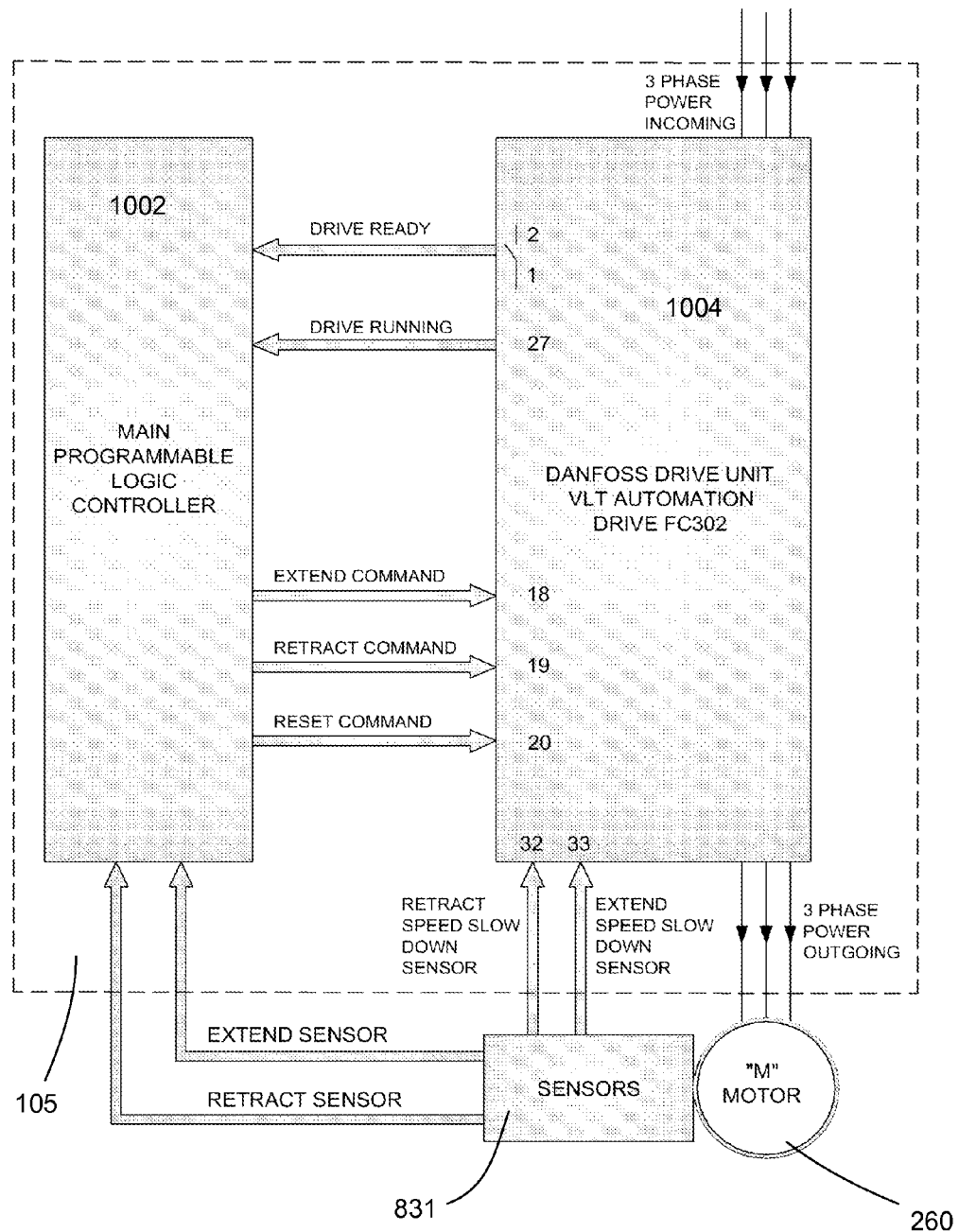
FIG. 10 illustrates an exemplary controller for a diverter assembly.

FIG. 10 illustrates an embodiment of controller 380 for operating a conveyor system. In one embodiment, the controller comprises a programmable logic controller (PLC) 1002 interconnected to an inverter controller 1004. The inverter controller may be a programmable controller that incorporates, for example, Smart Logic Control to enable it to execute the programmed logic. One example of such a controller that is commercially available is the Danfoss VLT Automation Drive FC 302 or its equivalent. In one embodiment, a sensor arrangement 831 is coupled to the PLC and inverter controller. The inverter controller receives 3-phase power supply which is supplied to a drive motor 260 of the diverter assembly.

The PLC may serve to control the overall operation of the diverter assembly. For example, it may determine which articles are to be diverted or not as they approach the diverter area on the primary conveyor. In addition, it may also determine whether the position of the diverter arms are to be changed or not, based on the input signals from the sensor arrangement. If the diverter arms need to have their positions changed, the appropriate command signal is issued by the PLC to the inverter controller. For example, PLC may issue an Extend Command signal to change the position of the diverter arms from the home to the divert position; the Retract Command signal causes the diverter arms to change from the divert to the home position. The PLC may issue a Reset Command to reset the positions of the diverter arms in the home position. On the other hand, no signals need to be issued if the diverter arms need not have their positions changed.

For example, if an article approaching the divert area has been determined that it is to remain on the primary conveyor, the PLC then determines the position of the diverter arms based on which sensor is activated. If the Extend Sensor signal is active, this indicates that diverter arms are in the divert position. In such case, the PLC would issue a Retract Command to move the diverter arms into the home position to allow the article to remain on the primary conveyor. If the Retract Sensor signal is active, this indicates that diverter arms are in the home position, which is the correct position. In such case, no signal to change the position of the diverter arms need to be issued by the PLC.

Once inverter controller 1004 receives a command signal (e.g., Extend Command or Retract Commands) from the main PLC to actuate diverter arms, it may take over control of the swinging operation with its own built-in logic controller (not shown). In particular, the inverter controller 1004 may change the speed of rotation of the diverter arms by sending different preset signals 1006 to drive motor 260, depending on the positions of the diverter arms. The values of these frequencies may be stored in a memory in the inverter controller 1004. In one embodiment, each swinging operation is carried out with a two-speed control. When the command signal is first received from the main PLC 1002, the inverter controller provides a first signal 1006a to operate drive motor. The first signal 1006a comprises a first preset signal to initiate a quick start of the drive motor. As the swivel arm (or diverter arms) rotates, a position sensor in the sensor arrangement 831 (e.g., sensor 836a in FIG. 8) senses that the swivel arm plate has reached its position and sends a slow down signal to the inverter controller 1004. The slow down signal may comprise the "Retract speed slow down" or "Extend speed slow down" signal, depending on whether the diverter arms are presently being retracted or extended. Upon receipt of the slow down signal, inverter controller 1004 then sends a second preset frequency to drive motor 260, causing the motor to run at a slower speed and to stop within a preset time delay. The time delay may be preset at 0.1 seconds or any other suitable values. After the time delay, the inverter controller ramps down the power to the motor until it reaches its final position.

Although a two-speed control is described above, it should be understood that more than two speeds may be used. By operating the swinging action of the swivel arm at multiple speeds, the overall switching operation may be achieved at a very short swing time with smooth and accurate positioning of the diverter arms. In one embodiment, very short swing times of about 0.3-0.5 seconds can be achieved with smooth and precise positioning of the diverter arms. This allows the handling capacity of the diverter system to be increased without the disadvantages attendant in conventional high speed diverter systems.

Figure 11A:
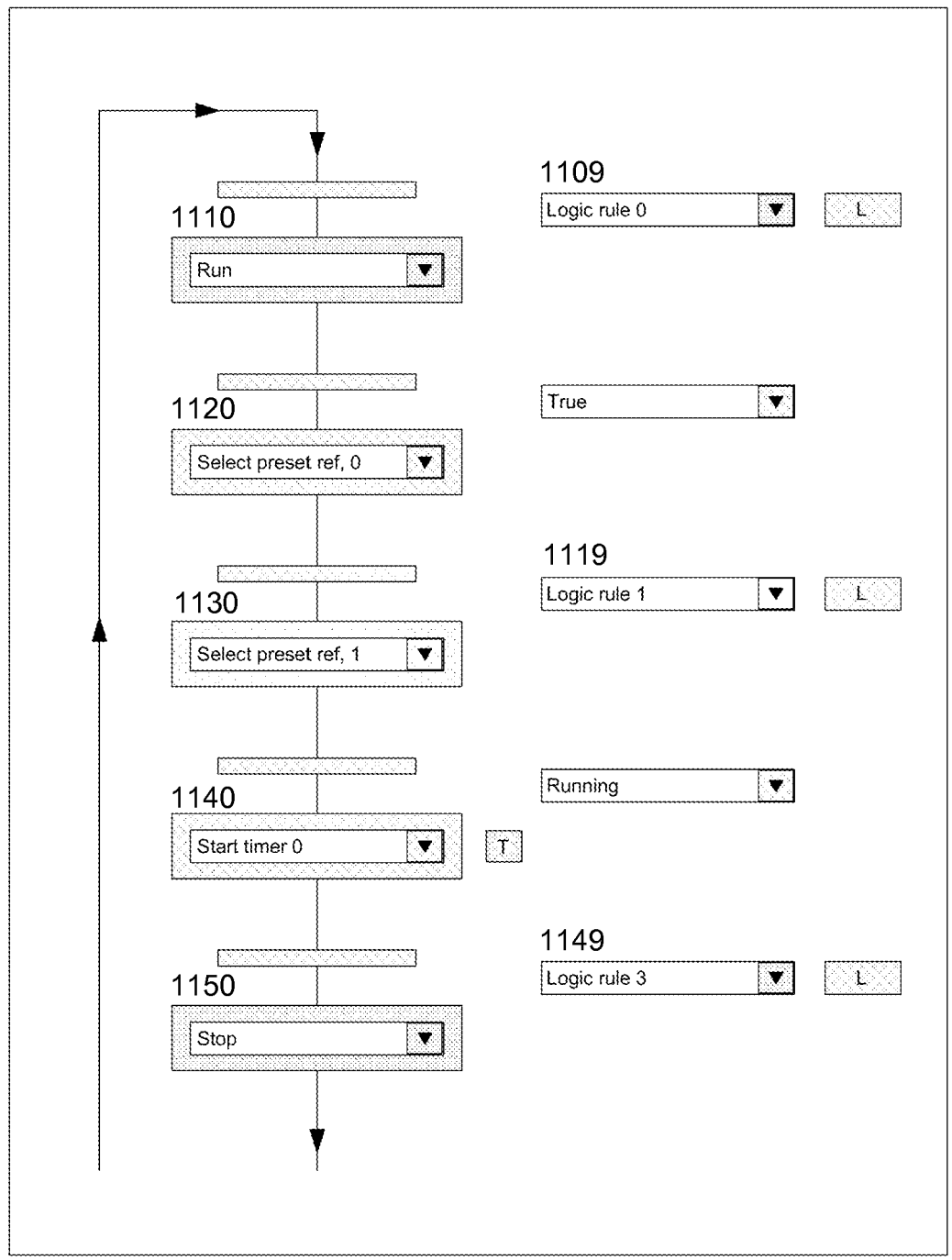
FIGS. 11a-e illustrate shot screens for programming an embodiment of an inverter controller.
Figure 11B:
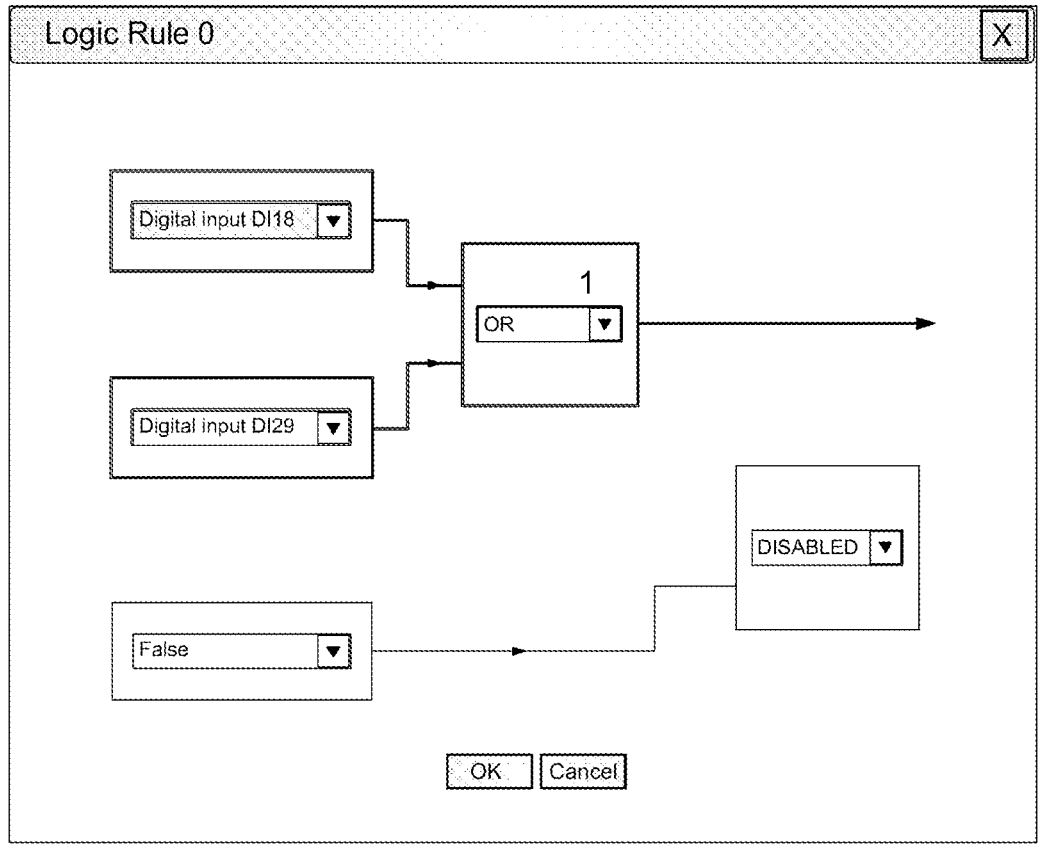
Figure 11C:
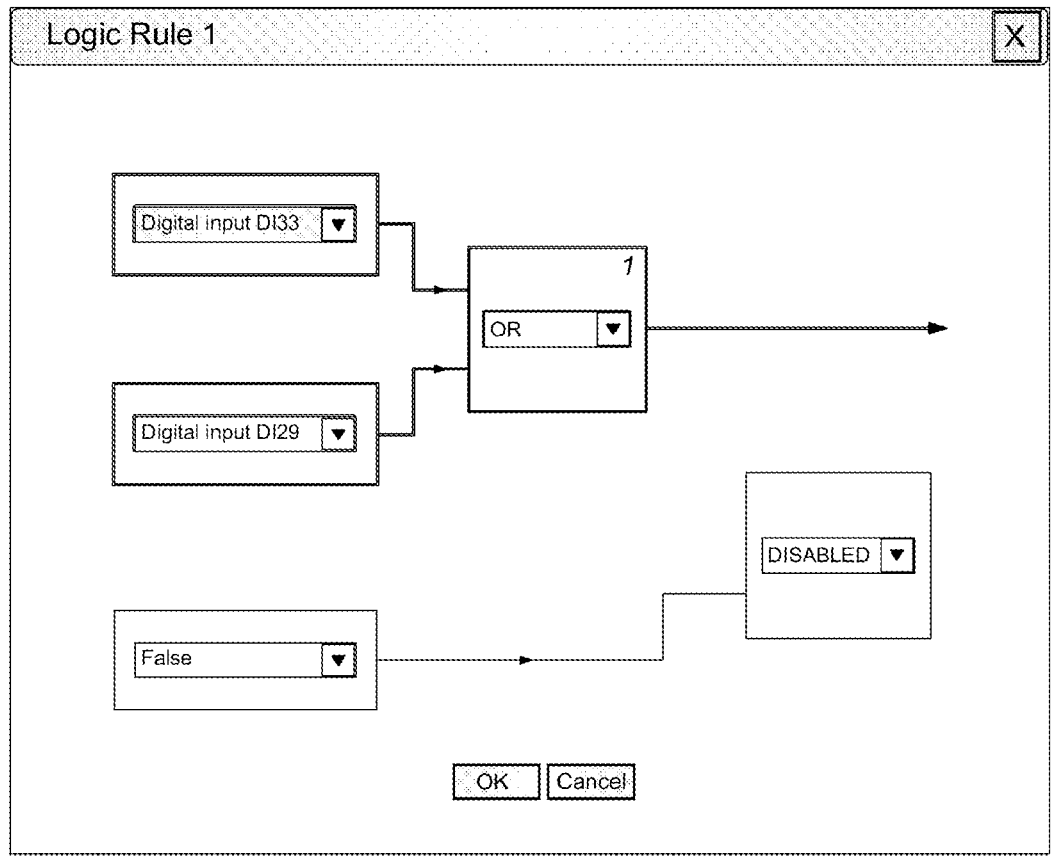

FIGS. 11a-e show screen shots of an embodiment of a programming logic for the Smart Logic Control in an inverter controller. FIG. 11a shows a screen shot for logic related to a command for moving the diverter arms from, for example, the home to the divert position. At 1109, logic rule 0 is accessed. FIG. 11b shows a screen shot of the programming of logic rule 0. As shown, logic rule 0 is a logical or function of the Extend Command and Reset Command from the PLC. If either of these signals are active, logic rule 0=a logic 1 or True. Referring back to FIG. 11a, if logic rule 0 is true (logic 1), the inverter controller initiates a run sequence for the motor at 1110. At 1120 the inverter controller runs the motor at a first preset frequency (e.g., preset ref. 0) to give a quick start of the motor to move the diverter arms.

Figure 11D:
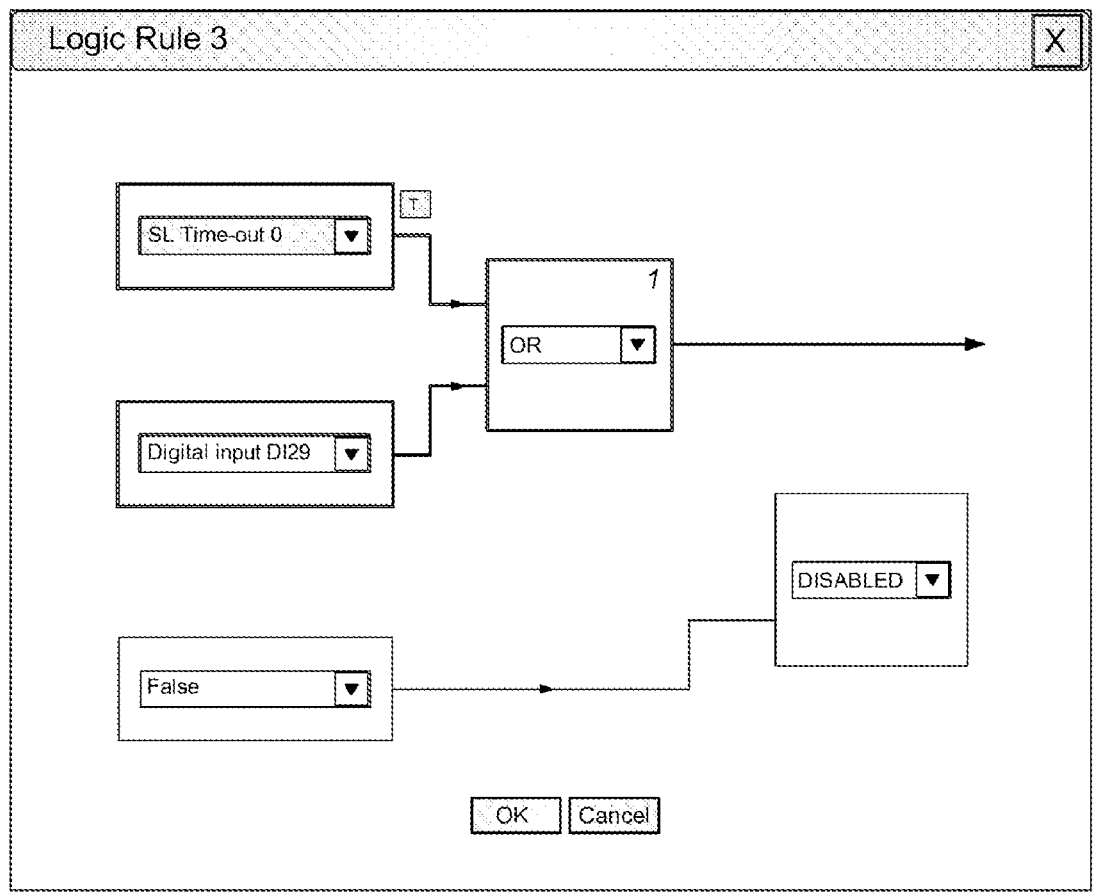

At 1119, logic rule 1 is accessed. FIG. 11b shows a screen shot of the programming of logic rule 1. As shown, logic rule 1 is a logical or function of the signal from the Extend Slow Down Proximity Sensor or Reset Command from the PLC. When either of these signals are active, logic rule 1=a logic 1 or True. Referring back to FIG. 11a, if logic rule 1 is true (logic 1), the inverter controller causes the motor to run at a second preset frequency (e.g., preset ref. 1) at 1130. The second preset frequency slows down the motor to decelerate the diverter arms. A timer is started at 1140. The motor runs at the second preset frequency until timer times out based on logic rule 3 at 1149, as shown in FIG. 11d. After the timer times out, the inverter controller stops the motor, at which point, the diverter arms are, for example, in the divert position.

Figure 11E:
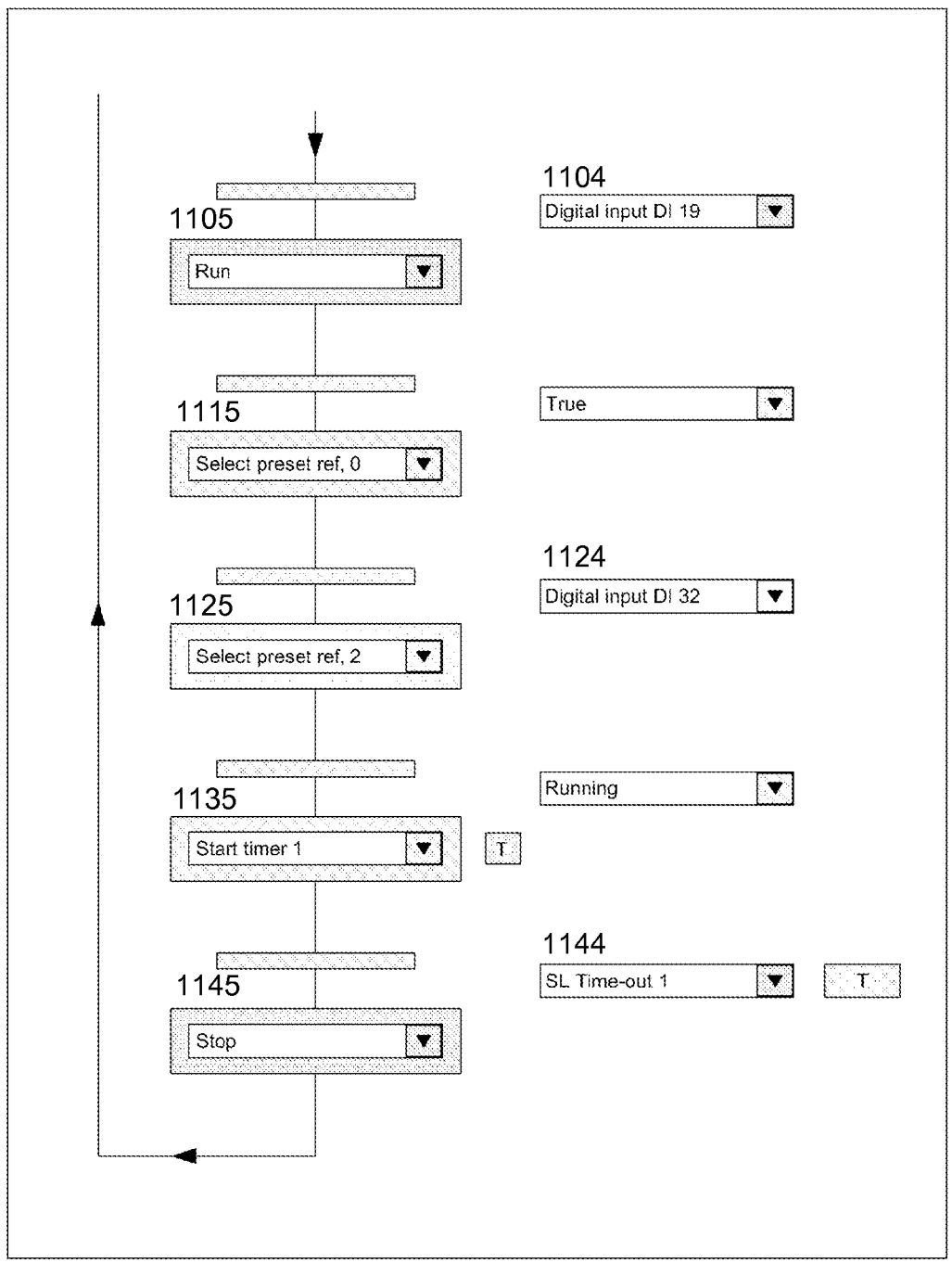

Referring to FIG. 11e, a screen shot for logic related to a command for moving the diverter arms from, for example, the divert to the home position is shown. At 1104, the inverter controller receives a Retract Command from the PLC. In response, the inverter controller, at 1105 initiates a run sequence for the motor. The controller runs the motor at a first preset frequency (e.g., preset ref. 0) at 1115 to give a quick start of the motor to move the diverter arms. Upon receiving a signal from the Retract Slow Down Proximity Sensor at 1124, the controller runs the motor at a second preset frequency (e.g., preset ref. 1). The second preset frequency slows down the motor to decelerate the diverter arms. A timer is started at 1135. The motor runs at the second preset frequency until timer times out at 1144. After the timer times out, the inverter controller stops the motor, at which point, the diverter arms are, for example, in the home position.

Figure 12:
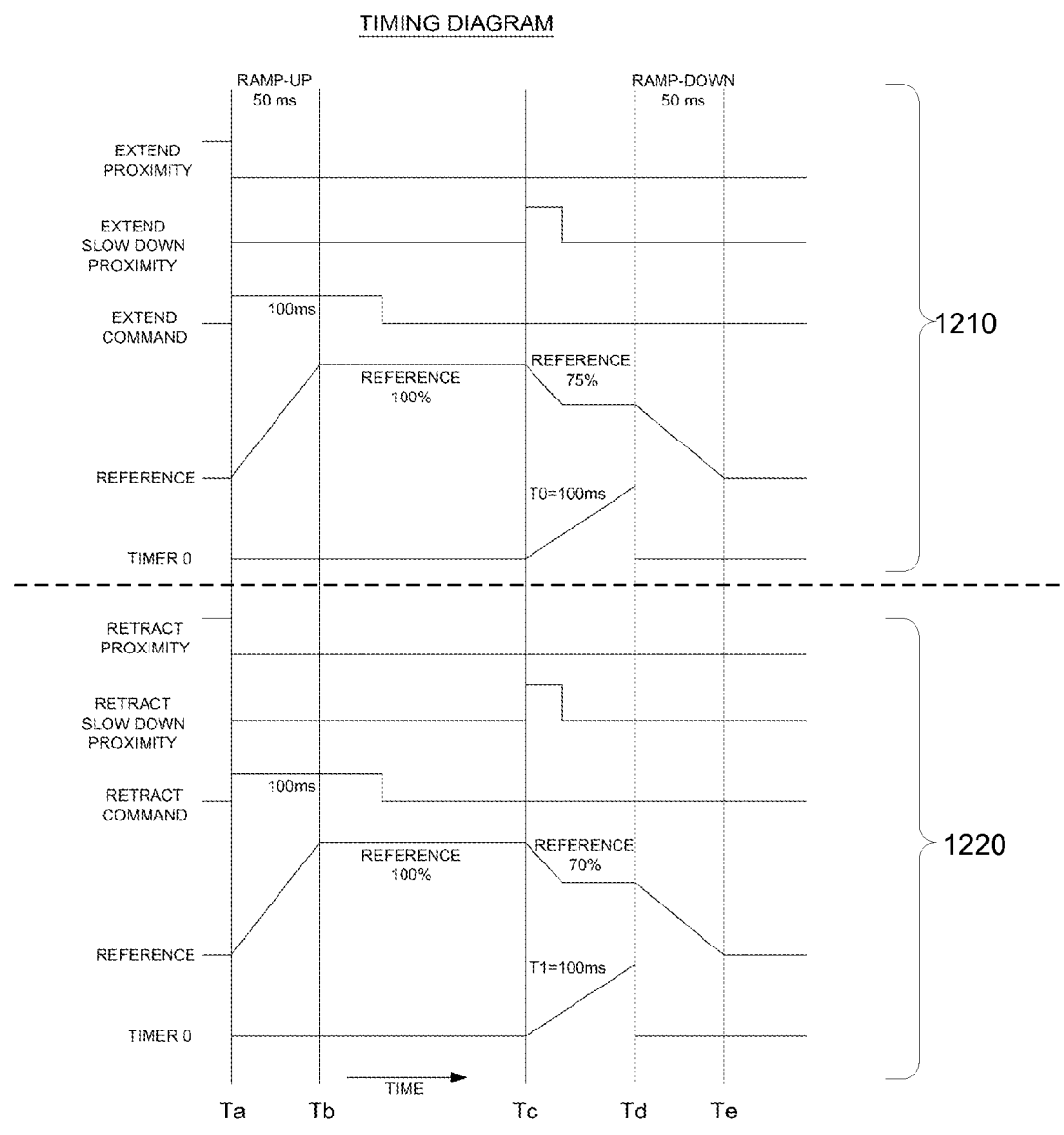
FIG. 12 illustrates a timing diagram of operating the diverter arms.

FIG. 12 shows an embodiment of a timing diagram 1200 for operating the diverter assembly. The timing diagram shows signals for an extend operation 1210 and a retract operation 1220. For an extend operation, at Ta, an Extend Command is issued by the PLC to the inverter controller. As shown, the Extend Command signal is about 100 ms in length. Since the diverter arm is in the home position, the Extend and Extend Down Proximity Sensors would have inactive signals. The inverter controller ramps up the power supplied to the motor causing it to rotate the diverter arms. The ramp up, for example, is about 50 ms until it reaches 100% of the desired power at Tb. Providing other ramp up times may also useful. From Tb to Tc, the motor operates at the desired power until Tc. At Tc, the swivel arm has activated the Extend Slow Down Proximity Sensor. Once the Extend Slow Down Proximity Sensor signal has been detected, the inverter controller reduces power to the motor to 75% of the desired power and continues to run at 75% until Td, when the timer times outs. In one embodiment, the timer, for example, is about 100 ms. Providing other time out periods is also useful. At Td, the inverter controller continues to ramp down to 0% of the power supplied to the motor. The ramp down time, for example, is about 50 ms. Other ramp down times may also be useful.

To initiate a retract operation, a Retract Command signal is issued by the PLC to the inverter controller. The retract operation is similar to the extend operation with the exception that the initial ramp down reduces the power to 70%.

As illustrated by FIG. 12, the inverter controller ramps up and ramps down the motor during operation to move the diverter arms from a first (e.g., home) to a second (e.g., divert) position. In one embodiment, the ramp up and ramp down phases are about 10-40% of the total time it takes to change position. It is understood that the ramp up and ramp down phases need not the be same duration. In one embodiment, the ramp down phase comprises a multi-stage ramp down phase. For example, as described, the power is ramp down to an intermediate power level to slow down the diverter arm. The initial ramp down stage may be a time stage. After time expires, the second or final ramp down continues until the diverter arms have reached their final position. In other embodiments, more then two ramp down stages may be provided.

Figure 13:
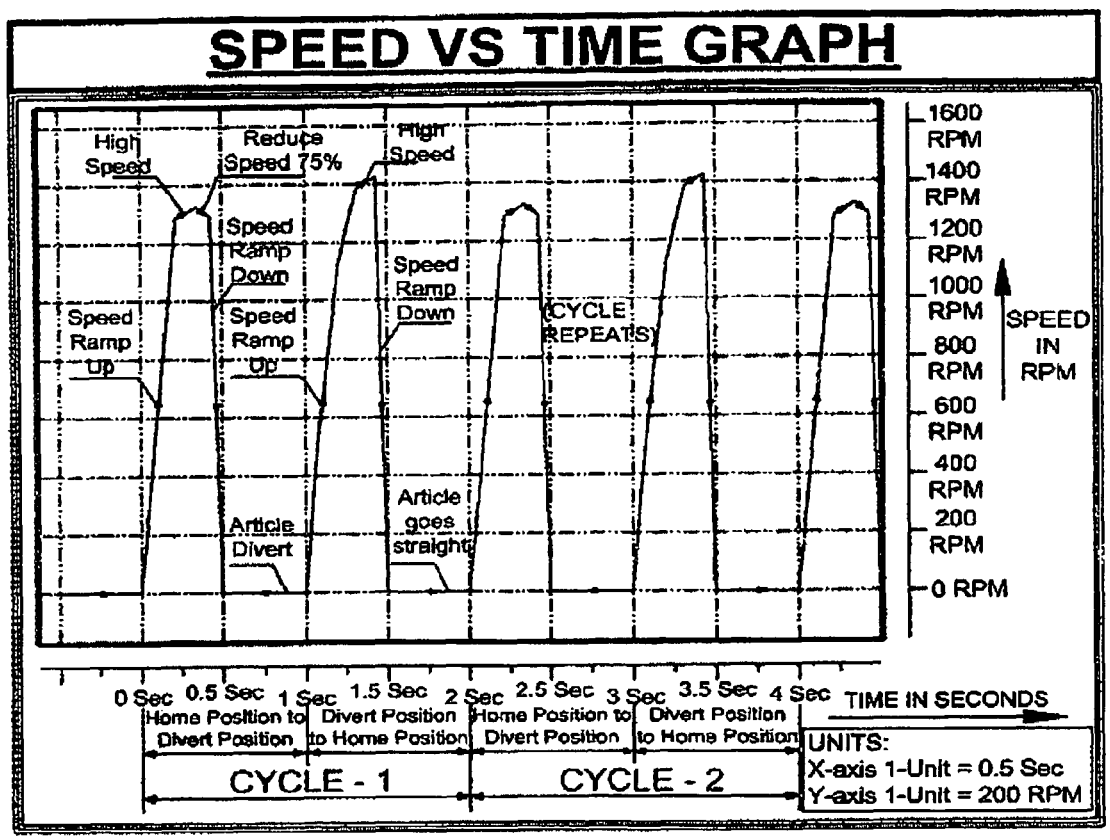
FIG. 13 illustrates a speed versus time diagram for the operation of the diverter arms.

FIG. 13 shows speed vs. time graph 1300 for an embodiment of a diverter assembly. The Graph shows two operating cycles (Cycle 1 and Cycle 2) of the diverter assembly, wherein an operating cycle includes extending the diverter arms from home position to the divert position and back to the home position after the article has been diverted. As can be seen, the drive motor operates at more than 1200 RPM to result in a change in position of diverter arms in about 0.5 seconds. Furthermore, this fast swing speed is achieved smoothly while stopping accurately at the divert and home positions.

As described, the inverter controller incorporates a multi-stage ramp down of power to the motor to decelerate the diverter arms before fully stopping. In one embodiment, the multi-stage ramp down comprises first and second ramp down stages. In other embodiments, more than two ramp down stages can be employed. By ramping down of power to the motor in multiple stages, the inertia of the diverter arms is reduced, which results in reducing or preventing vibration when operating at high swing speeds.

The inverter controller with multi-stage ramping down of power can be employed for other diverter assemblies. For example, diverter assemblies having a single diverter is also useful. In alternative embodiments, the diverter arm or arms of the diverter assembly may be linearly shifted into the home or divert position.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A diverter assembly for handling articles transported on a conveying surface, comprising:
   at least one diverter arm positioned adjacent to a side of the conveying surface;
   a motor coupled to a drive arrangement for moving the diverter arm over the conveying surface;
   a controller unit having first and second controllers are coupled to the motor for operating the motor at a plurality of speeds, wherein the first controller comprises a programmable logic controller and the second controller comprises an inverter controller; and
   a sensor arrangement coupled to the controller unit for monitoring the position of the diverter arm, wherein the sensor arrangement sends a signal to the controller unit when the diverter arm reaches a pre-determined position, wherein the controller unit operates the motor at a slower speed in response to the signal from the sensor arrangement.

2. The diverter assembly of claim 1 wherein the sensor arrangement comprises a plurality of position sensors.

3. The diverter assembly of claim 2 wherein at least one position sensor is coupled to the programmable logic controller and at least one position sensor is coupled to the inverter controller.

4. The diverter assembly of claim 2 wherein the sensor arrangement comprises four position sensors.

5. The diverter assembly of claim 1 wherein the drive arrangement includes a drive rod and a swivel arm.

6. The diverter assembly of claim 5 wherein the sensor arrangement includes a sensor mounting plate.

7. The diverter assembly of claim 6 wherein the sensor mounting plate includes a slot on which sensor is mounted.

8. The diverter assembly of claim 7 wherein the slot comprises a curved slot.

9. The diverter assembly of claim 1 wherein the plurality of speeds comprises at least two different speeds.

10. The diverter assembly of claim 1 wherein the diverter arm is operable to move from the first position to the second position in about 0.3-0.5 seconds.

11. A method for handling articles transported on a conveying surface comprising:
   providing a diverter assembly having at least one diverter arm positioned adjacent to a side of the conveying surface;

determining whether the diverter arm is in a first position;

operating a motor of the diverter assembly at a plurality of speeds;

moving the diverter arm from the first position to a second position at a first speed;

monitoring the position of the diverter arm, wherein when the diverter arm reaches a pre-determined position, operating the motor at a second speed, wherein monitoring the position of the diverter arm further includes operating the motor at a third speed when the diverter arm reaches a second predetermined position.

12. The method of claim 11 wherein the second speed is slower than the first speed.

13. The method of claim 12 further comprises moving the diverter arm from the predetermined position to the second position.

14. The method of claim 11 wherein the third speed is slower than the second speed.

15. The method of claim 14 further comprises:

moving the diverter arm at the third speed from the second-predetermined position to the second position.

16. The method of claim 11 wherein operating the motor of the diverter assembly at a plurality of speeds at different positions reduces vibration.

17. A diverter assembly for handling articles transported on a conveying surface comprising:

at least one diverter arm positioned adjacent to a side of the conveying surface;

a motor coupled to a drive arrangement for moving the diverter arm from an initial position to a second position over the conveying surface; and a controller unit coupled to the motor for operating the motor at a speed profile, wherein the controller unit is adapted to operate the motor at an initial speed, when the diverter arm moves from the initial position to a pre-determined position, and operate the motor at a second speed slower than the initial speed, when the diverter arm moves from the pre-determined position to the second position.

18. The diverter assembly of claim 17 wherein the controller unit comprises an inverter controller.

19. The diverter assembly of claim 17 further includes a sensor arrangement coupled to the controller unit for monitoring the position of the diverter arm.

20. The diverter assembly of claim 19 wherein the sensor arrangement comprises a plurality of position sensors.

21. The diverter assembly of claim 20 wherein at least one position sensor is coupled to the controller unit.

\* \* \* \* \*